(12) United States Patent
Finn et al.

(10) Patent No.: US 8,733,788 B2
(45) Date of Patent: May 27, 2014

(54) INFLATABLE AIRBAG AND A METHOD FOR MAKING THE SAME

(75) Inventors: Hugh Finn, Cheshire (GB); Ralf Koehnen, Cheshire (GB); David Stow, Gothenburg (SE); Gary Wootton, Staffordshire (GB); Altay Kismir, Ontario (CA); Will Winzinger, Ontario (CA); Gonzalo Alves, Ontario (CA)

(73) Assignee: Autoliv Development AB, Värgárda (SE)

( * ) Notice: Subject to any disclaimer, the term of this patent is extended or adjusted under 35 U.S.C. 154(b) by 10 days.

(21) Appl. No.: 13/639,659

(22) PCT Filed: Mar. 17, 2011

(86) PCT No.: PCT/EP2011/001313
§ 371 (c)(1),
(2), (4) Date: Oct. 5, 2012

(87) PCT Pub. No.: WO2011/124315
PCT Pub. Date: Oct. 13, 2011

(65) Prior Publication Data
US 2013/0026740 A1    Jan. 31, 2013

(30) Foreign Application Priority Data
Apr. 9, 2010  (EP) .................................. 10159489

(51) Int. Cl.
*B60R 21/16* (2006.01)
(52) U.S. Cl.
USPC ........................................ 280/728.1; 442/226
(58) Field of Classification Search
USPC ............. 280/728.1, 743.1; 442/76, 158, 226, 442/227
See application file for complete search history.

(56) References Cited

U.S. PATENT DOCUMENTS 7,951,437 B2 * 5/2011 Keshavaraj et al. ........... 428/35.7
7,985,702 B2 * 7/2011 Kano et al. .................... 442/158
(Continued)

FOREIGN PATENT DOCUMENTS

EP  0 458 838 B1  5/1996
EP  1 475 475 B1  6/2008
(Continued)

OTHER PUBLICATIONS

PCT International Search Report—Jul. 11, 2011.
European Examination Report—Aug. 18, 2010.

*Primary Examiner* — Faye M. Fleming
(74) *Attorney, Agent, or Firm* — Brinks Gilson & Lione

(57) ABSTRACT

A method of forming a fabric for an air-bag, the method comprising providing a plurality of yarns, each yarn being formed from a plurality of individual fibres; applying an activatable additive or coating to each yarn, the additive or coating initially not being activated and wherein, prior to activation, the additive or coating presents little or no impedance to the relative movement of the fibres within the yarn and, following activation, the additive or coating binds fibres within the yarn to one another to prevent or hinder relative movement of the fibres in the yarn with respect to one another; and passing the yarns through an activation zone including a compressing component which applies a compressive force to the yarns, the additive or coating being activated as the yarns pass through the activation zone so that the yarns each have a substantially flat configuration.

22 Claims, 3 Drawing Sheets

(56) References Cited

U.S. PATENT DOCUMENTS

| | | |
|---|---|---|
| 8,118,324 B2 * | 2/2012 | Sollars, Jr. ................ 280/729 |
| 2006/0284403 A1 | 12/2006 | Hill |
| 2010/0129575 A1 * | 5/2010 | Veiga ........................ 428/35.4 |
| 2010/0159189 A1 * | 6/2010 | Takagi et al. ............... 428/107 |
| 2011/0210532 A1 * | 9/2011 | Johansson ............... 280/728.1 |
| 2013/0020791 A1 * | 1/2013 | Yamamoto et al. ....... 280/743.1 |
| 2013/0106085 A1 * | 5/2013 | Kismir et al. ............. 280/743.1 |

FOREIGN PATENT DOCUMENTS

| | | |
|---|---|---|
| GB | 1 463 969 | 2/1977 |
| WO | WO 90/09295 | 8/1990 |
| WO | WO 01/34435 A1 | 5/2001 |
| WO | WO 2010/027228 A2 | 3/2010 |

* cited by examiner

WEAVE A

2 LAYERS

WEAVE B

INFLATABLE AIRBAG AND A METHOD FOR MAKING THE SAME

CROSS-REFERENCE TO RELATED APPLICATIONS

This application claims priority to European Patent Application No. 10159489.3, filed Apr. 9, 2010 and PCT/EP2011/001313, filed Mar. 17, 2011.

FIELD OF THE INVENTION

The present invention relates to an inflatable airbag suitable for use as at least part of a motor vehicle safety device. The invention also relates to a method of making an airbag.

BACKGROUND OF THE INVENTION

It is now widely known to provide one or more inflatable airbags within the interior compartment of a motor vehicle, for inflation upon receipt of an appropriate signal from a crash sensor indicative of an actual or predicted accident, in order to provide protection to the driver or other occupants of the motor vehicle. Typically, airbags of this nature are constructed from woven fabric, and are initially folded and/or rolled into a tight package provided behind a rupturable cover in an airbag module. The folded airbag is fluidly connected to an inflator such as a gas generator which is configured to generate a large volume of inflating gas and to direct that gas into the airbag upon receipt of said crash-signal.

As will be appreciated, given the very short period of time within which an airbag must inflate in order to provide adequate protection to a vehicle occupant in the event of a crash, the flow of gas used to inflate the airbag can be very powerful, and is also generally very hot. It is therefore conventional to provide the fabric of the airbag with a surface coating in order to impart flame resistant properties to the fabric, and also to manage the permeability of the fabric to the inflating gas and particles produced by the gas generator. In this regard, it is known to use woven fabric of polyamide material, and to coat the fabric with a silicone coating which has been found to have good levels of impermeability to gases and particles, and to have relatively good long term aging performance. However, it has been found that there are a number of problems with conventional woven airbag fabrics when coated in this way.

For example, conventional woven fabrics have a surface which is slightly uneven, as a consequence of the difference in height between the peaks and troughs of the yarns as the yarns are woven around each other. This can be particularly pronounced in so called "one-piece-woven" airbags comprising two layers of fabric, the two layers being combined in selected areas as they are woven, to form an integral seam in which yarns forming one of said layers are interwoven with yarns forming the other said layer.

An exemplary method of weaving a one-piece-woven airbag is disclosed in EP0458838A.

Another problem that arises with conventional one-piece-woven fabrics used for airbags is that they have a significant inherent angle between yarns where the yarns are interlaced, the angle being caused by wrapping the yarns around one another. This angle causes the cross-sectional thickness of the fabric to increase, and also causes localized gaps to form between yarns. This necessitates a thicker layer of coating with a resulting increase in the weight of the coating in order to achieve the desired permeability, again increasing the weight and cost of the fabric, and also resulting in a fabric which is less susceptible to very tight folding for packaging purposes.

As will be appreciated, it is generally favorable for airbag fabrics to be as lightweight and flexible as possible, so that they can be folded very tightly into small airbag modules, and so that they can be inflated by relatively low volumes of gas, thereby requiring smaller inflators. However, this desire for a lightweight woven fabric must be balanced with the requirement for the fabric to have a sufficient inherent impermeability to gas, or else the fabric will require a thicker coating, thereby negating the effect of its light weight.

While lightweight fabrics can easily be woven with a relatively open weave (i.e. low sett), thereby reducing the mass of yarn material per unit area, the resulting open weave is less susceptible to coating, for the reason that the coating must seal larger interstices between adjacent yarns.

It is therefore an object of the present invention to provide an improved airbag. It is another object of the present invention to provide an improved method of making an airbag.

SUMMARY

According to a first aspect of the present invention, there is provided a method of forming a fabric for an air-bag, the method comprising the steps of: providing a plurality of yarns, each yarn being formed from a plurality of individual fibres; applying an activatable additive or coating to each yarn, the additive or coating initially not being activated and wherein, prior to activation, the additive or coating presents little or no impedance to the relative movement of the fibres within the yarn and, following activation, the additive or coating binds the fibres within the yarn to one another to prevent or hinder relative movement of the fibres in the yarn with respect to one another; and passing the yarns through an activation zone, the activation zone including a compressing component which applies a compressive force to the yarns, the additive or coating being activated as the yarns pass through the activation zone so that, following activation of the additive or coating, the yarns each have a substantially flat configuration so as to have a first relatively small cross-sectional dimension (a), and a second relatively large cross-sectional dimension (b).

In another form, the coating or additive is activated by the application of pressure to the yarns.

In another form, the coating or additive is activated as the yarns pass through the compressing component.

In another form, the coating or additive is activated by heat.

In another form, the activation zone comprises one or more heating components configured to supply sufficient heat to the yarns to activate the coating or additive.

In another form, the coating or additive is activated through contact with another substance.

In another form, the activation zone includes at least one delivery component configured to deliver a sufficient quantity of the other substance to the yarns to activate the coating or additive.

In another form, the method further comprises the step of applying a further coating to at least one surface of the fabric.

In another form, the step of applying said further coating comprises applying the further coating in a substantially liquid phase.

In another form, the step of applying said further coating comprises forming a thin film of said further coating and laminating said film to the fabric.

In another form, following the passing of the yarns through the activation zone, the ratio of the first and second dimensions is at least 1.5.

In another form, a plurality of the yarns are woven into a fabric before being passed through the activation zone.

In another form, a plurality of the yarns are woven into a fabric after passing through the activation zone.

In another form, during or after weaving the yarns into a fabric, the fabric is passed through a second activation zone.

In another form, after the fabric has passed through the second activation zone, the additive or coating is activated and binds the yarns within the fabric to one another to prevent or hinder relative movement of the yarns with respect to one another.

In another form, the method further comprises the step of applying a further additive or coating to the yarns prior to the weaving of the yarns to form the fabric, and wherein the further additive or coating is activated and binds the yarns within the fabric to one another to prevent or hinder relative movement of the yarns with respect to one another.

In another form, the method comprises the step of calendering the fabric.

In another form, the method comprises the step of providing an air-bag formed from the fabric.

A further aspect of the present invention provides an inflatable airbag for a motor vehicle safety device, the airbag comprising a fabric, wherein the fabric comprises yarns which are each composed of a plurality of fibres, and formed into a substantially flat configuration so as to have a first relatively small cross-sectional dimension (a), and a second relatively large cross-sectional dimension (b), at least some fibres in each yarn being bonded to other fibres in the yarn by an activated coating or additive, wherein, prior to activation, the additive or coating presents little or no impedance to relative movement of the fibres within the yarn and, following activation, the additive or coating binds fibres within the yarn to one another to prevent or hinder relative movement of the fibres in the yarn with respect to one another.

In another form, the ratio of the first and second dimensions is at least 1.5.

In another form, the airbag has a one-piece-woven construction comprising two layers of said fabric, the two layers being combined in selected areas to form an integral seam in which yarns forming one of said layers are interwoven with yarns forming the other said layer.

In another form, said yarns comprise filaments of polyamide, polyester or polypropylene.

Another aspect of the present invention provides a method of forming a fabric for an air-bag, the method comprising the steps of: providing a plurality of yarns, the yarns each having a substantially flat configuration so as to have a first relatively small cross-sectional dimension (a), and a second relatively large cross-sectional dimension (b), and having an activatable additive or coating applied to at least some of the yarns, the additive or coating, prior to weaving, not being activated and wherein, prior to activation, the additive or coating presents little or no impedance to relative movement of yarns with respect to one another and, following activation, the additive or coating binds the yarns to one another to prevent or hinder relative movement of the yarns with respect to one another; weaving the yarns to form a fabric; and passing the fabric through an activation zone, the additive or coating being activated as the fabric pass through the activation zone.

In another form, activation of the additive or coating comprises re-activation of the additive or coating.

BRIEF DESCRIPTION OF THE DRAWINGS

So that the invention may be more readily understood, and so that further features thereof my be appreciated, embodiments of the invention will now be described by way of example with reference to the accompanying drawings in which.

DETAILED DESCRIPTION OF THE INVENTION

Figure 1:
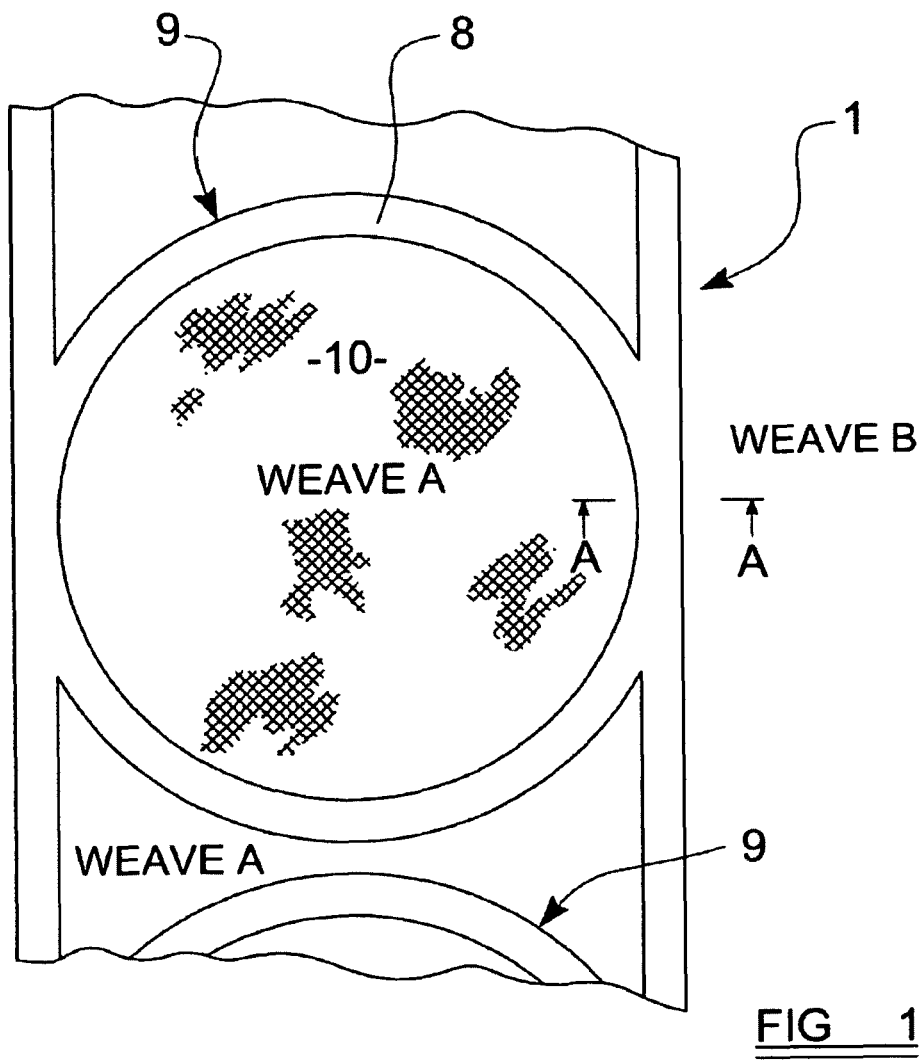
FIG. 1 is a partial plan view of a circular airbag formed as part of a one-piece-woven web of fabric.
Figure 4:
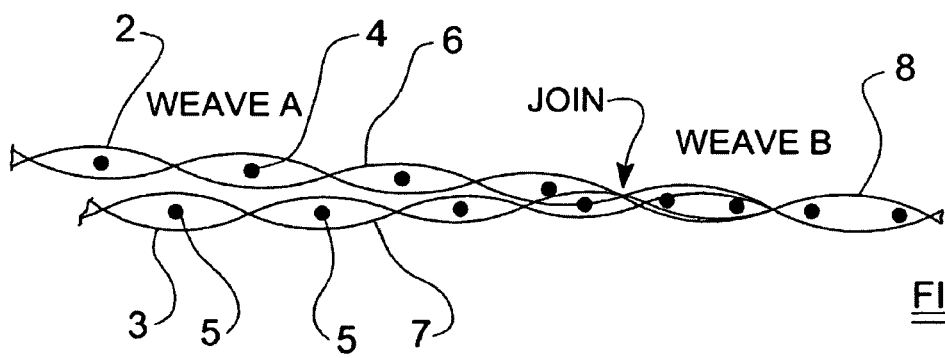
FIG. 4 is an enlarged diagrammatic sectional view through an edge region of the airbag, taken on line A-A in FIG. 1 showing the nature of the fabric interlacing.

Turning now to the drawings in further detail, FIG. 1 illustrates part of a web 1 of fabric produced on a loom via a one-piece-weaving technique in which two fabric layers or plies are woven simultaneously and are joined with one another at selected areas. As can be seen more clearly from FIG. 4, an upper layer of fabric 2 and an adjacent lower layer of fabric 3 are produced simultaneously from respective warp yarns 4, 5 and respective weft yarns 6, 7 using a weave pattern identified as "Weave A". This simultaneous weaving technique produces two discrete and quite separate plies of fabric. However, at selected areas 8, the two layers 2, 3 are combined into a single layer of fabric, which is woven integrally from the constituent warp yarns 4, 5 and weft yarns 6, 7 of the two layers 2, 3 so as to have a weave pattern referred to as "Weave B".

Figure 2:
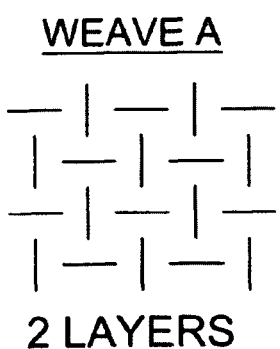
FIG. 2 illustrates an exemplary weave suitable for the fabric layers in the airbag of FIG. 1.
Figure 3:
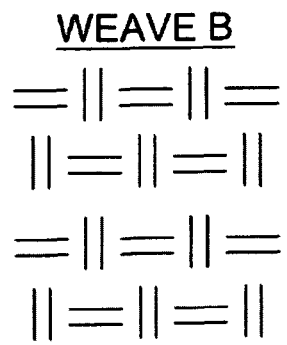
FIG. 3 illustrates an exemplary combined weave for the edges of the airbag illustrated in FIG. 1.

The two fabric layers 2, 3 are effectively interwoven with one another by interlacing the warp and weft yarns 4, 6 of the upper layer 2 with the warp and weft yarns 5, 7 of the lower layer 3. For example, where the separate regions of the upper and lower layers 2, 3 are woven with a conventional plain weave pattern (A) such as that illustrated in FIG. 2, then in the selected areas 8, where the warp and weft yarns of the two layers are interlaced, the resulting weave will have a hopsack configuration (B) such as that illustrated in FIG. 3. Of course, it should be appreciated that other weave configurations are possible, reference being made to a plain weave and combined hopsack weave merely for the sake of clarity and general understanding.

In this manner, in one continuous weaving operation, a number of airbags generally designated 9 can be produced in a single web of woven fabric via one weaving step. In the particular configuration illustrated in FIG. 1, the airbags each have a generally circular configuration, but of course it should be appreciated that the shape, and indeed size, of the airbag can easily be adjusted by appropriately programming the loom. By cutting around the circular peripheral region 8 in which the two layers of fabric are interwoven, the individual airbag 9 may be released from the web for finishing. The periphery of the airbag will thus be defined by the region 8 within which the two layers 2, 3 are interwoven with one another, in the manner of an integral seam.

Figure 5:
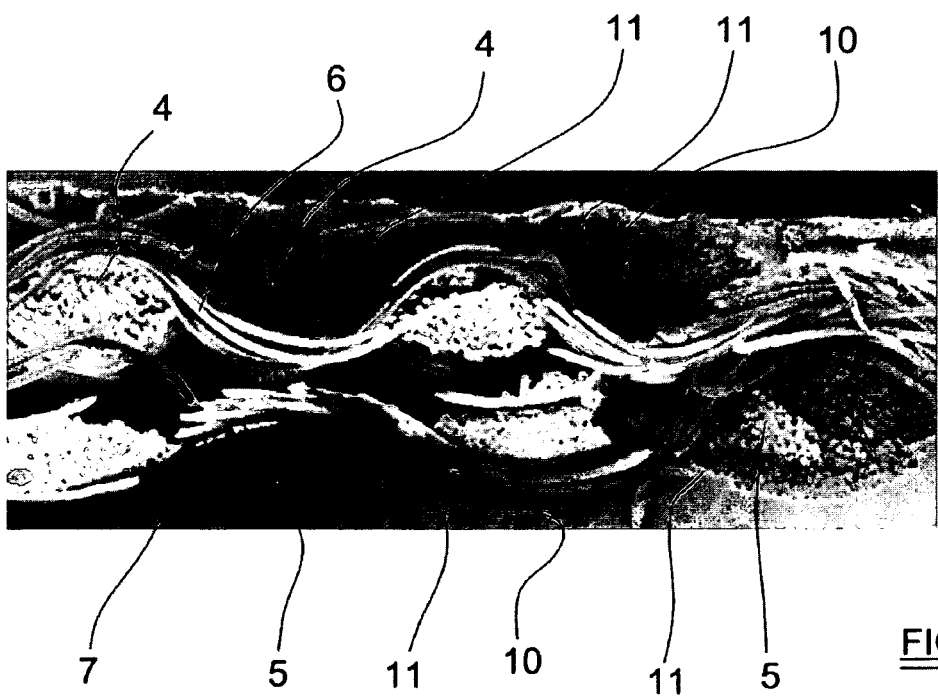
FIG. 5 is a magnified view, similar to that of FIG. 4, showing the woven structure of the airbag in greater detail, and showing a coating applied to the outer surfaces of the bag.

As explained above, it is conventional to coat at least one surface of an airbag fabric of the type described above such as, for example, by using a silicone coating. FIG. 5 illustrates, in a highly magnified view, a cross-section taken through a region of a one-piece-woven fabric airbag of the type described above, and illustrates the constituent filaments of the warp and weft yarns of the fabric. The fabric is illustrated with a silicone coating 10 applied to the upper and lower surfaces of the fabric, the coating filling the interstices between adjacent warp and weft yarns. As will be appreciated from FIG. 5, the warp yarns 4, 5 of the two layers of fabric are shown in cross-sectional view and can be seen to have a significant thickness and a generally round configuration. As will be appreciated, the weft yarns have a similar cross-sectional configuration. Because the warp and weft yarns have a significant thickness, the one-piece-woven structure results in the individual yarns following a generally serpentine path with significant deflection. This results in quite significant gaps 11 where the warp and weft yarns cross which must be filled by the coating 10, thus resulting in a relatively thick coating which necessitates use of a considerable volume of silicone and thereby adding weight and cost to the coated fabric. Furthermore, a relatively thick coating is required to cover all of the yarns, simply due to the thickness of the substantially round yarns.

Figure 6:
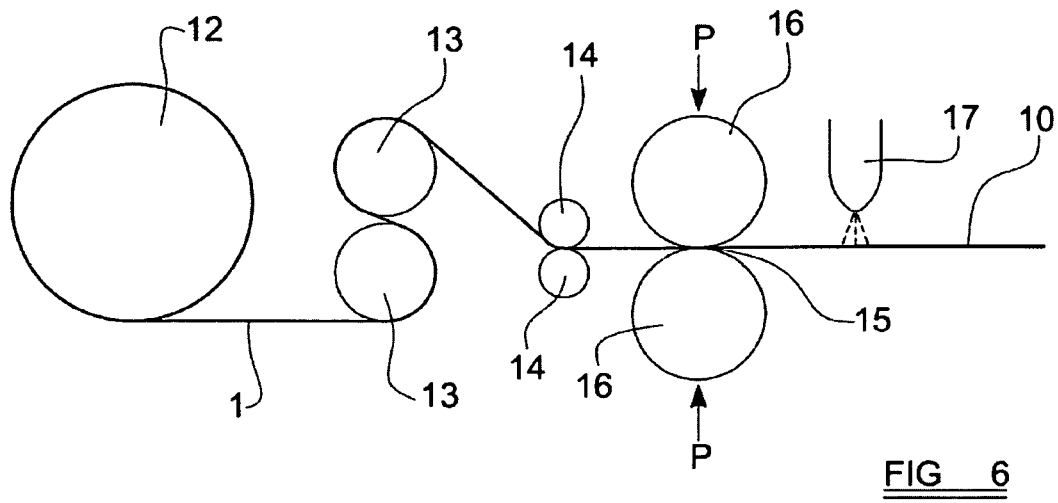
FIG. 6 is a schematic illustration showing a fabric treatment step which may be used to form an airbag in accordance with the present invention.

One embodiment of the present invention proposes treating a pre-woven fabric, and in particular a one-piece-woven fabric structure similar to that described above in the context of FIGS. 1 to 4, in order to flatten the cross-section of the constituent warp and weft yarns prior to application of the coating 10. In this regard, FIG. 6 illustrates in simplified form a treatment process of the type contemplated. It is proposed that a web 1 of generally conventionally woven fabric will be provided on a spool or drum 12 following the initial weaving process and which may then be transported to the stage of the fabric treatment process of the present invention. Alternatively, however, it should be appreciated that the web 1 of fabric created on the loom could simply be passed directly to the fabric treatment process illustrated in FIG. 6, thereby obviating the need for an intermediary drum or spool 12.

Prior to winding the fabric onto the spool or drum 12, the fabric is treated to include a coating or additive which is activated by the application of heat and/or pressure. Once activated, the coating or additive links the fibres of each yarn to one another, and tends to prevent relative movement of the fibres with respect to one another. It will be understood that the effect of this is to assist in maintaining the cross-sectional shape of the yarn. The coating or additive may take the form of a heat and/or pressure activated polymer, such as thermo setting or heat activated polyurethane or heat activated silicone. The coating or additive may be an adhesive.

Prior to activation, however, the coating or additive has little or no effect on the formation or arrangement of fibres in the yarn, and presents little or no impediment to movement of the fibres with respect to one another.

In an embodiment, the coating or additive may be applied to some or all of the fibres prior to the combination of the fibres to form a yarn. In another embodiment, the fibres may be combined to form a yarn, and the coating or additive is subsequently applied. Coatings or additives (which need not be the same) may be applied before as well as after the combination of the fibres to form a yarn.

The web of fabric 1 is paid out from the drum or spool 12 and is fed around a pair of feed rolls 13 arranged for counter-rotation relative to one another. The feed rolls serve to pull the fabric 1 from the spool 12 and to tension the fabric appropriately for the subsequent steps of the procedure. The web of fabric 1 thus engages the outer surface of the lower feed roll 13 and passes into engagement with the outer surface of the upper feed roll 13 as the web passes between the two rolls, from where the web then remains in contact with the outer surface of the upper feed roll 13 until such time as it is directed away from the upper feed roll 13 so as to pass between a pair of heating rolls 14 which are heated and arranged for counter-rotation relative to one another. The heating rolls 14 thus serve to heat the fabric exiting the feed rolls. If the coating or additive is heat-activated, then the coating or additive may be activated at this stage. Following activation it may be a matter of a few seconds or minutes before the linking effect of the coating or adhesive takes full effect.

The web of fabric 1 exits the two heating rolls 14 and from there passes through the nip 15 between a pair of calender rolls 16. The two calender rolls 16 are urged towards one another under high pressure so as to impart a significant compressive force to the fabric passing through the nip 15. This compressive force is sufficient to flatten the cross-section of the constituent yarns of the fabric web 1 so that they adopt a configuration similar to that illustrated in FIG. 7 which will be described in more detail herein below.

If the coating or additive is pressure-activated, then the coating or additive may be activated at this stage.

It will be understood that, after passing through the heating rolls 14 and the nip 15, the coating or additive will have been activated and the effect of this will be to hold the fibres in the flattened configuration, and prevent or hinder the fibres from returning to, or subsequently being formed into, a yarn having a differently-shaped cross-section, such as a generally circular cross section.

In embodiments of the invention, the coating or additive may be activated other than by pressure or heat. For instance, the coating or additive may be activated through coming into contact with water, or another substance. In these embodiments a water spray may be provided as part of the apparatus, for example before the nip 15.

In general, the yarns must pass through an activation zone, which includes the nip 15 and, if appropriate, another mechanism or component for activating the coating or additive.

Providing a heat and/or pressure activated coating or additive which is activated during the manufacturing process in this way confers several advantages over the use of pre-made flattened yarns. For instance, the degree of flatness of the yarns may need to be controlled, or varied depending on factors such as the type of air-bag that is being made, or the properties of a particular batch of yarn. This could, for instance, be achieved by varying the pressure that is applied to the fabric as it passes through the nip 15. This would allow yarns having a variety of different flatnesses to be produced, starting from an identical source of generally circular yarns. A further advantage is that distortion of the yarns before the air-bag is formed, for instance during transit, will not affect the quality of the finished air-bag.

After being calendered between the calender rolls 16, the fabric may then be coated with a silicone coating 10 in a generally conventional manner, such as by applying the coating in liquid phase via one or more spray nozzles 17. Alternatively, however, the coating 10 could be applied to the fabric by substantially pre-forming the coating in the form of a thin film and then laminating the thin film to the fabric.

Figure 7:
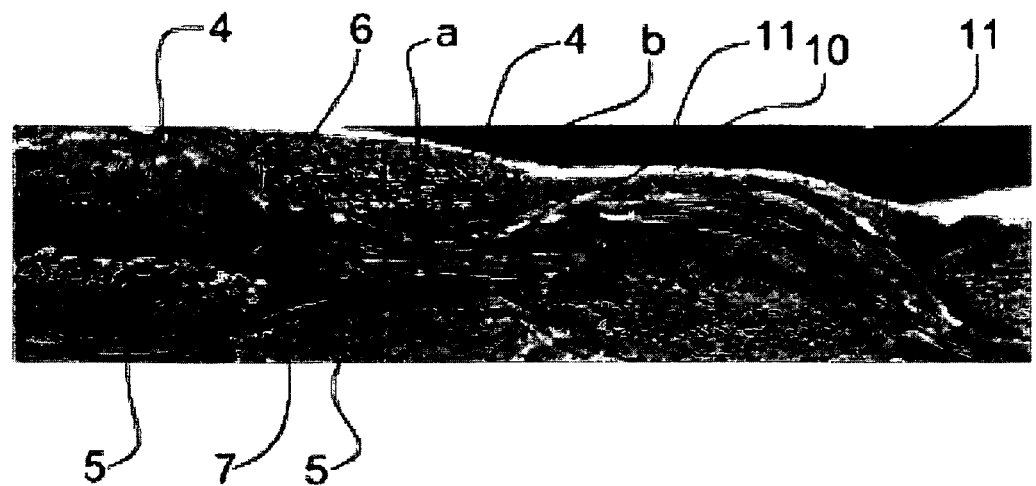
FIG. 7 is a magnified view, generally similar to that of FIG. 5, but showing the woven structure of an airbag in accordance with the present invention.

Turning now to consider FIG. 7 in more detail, it should be noted that as a result of the aforementioned pre-treatment of the fabric, and in particular by calendering the fabric under the application of high pressure between the two calender rolls 16, the constituent yarns of the fabric have been significantly flattened in cross-section relative to the more conventional figuration illustrated in FIG. 5. It will therefore be seen that in cross-section, the yarns of the fabric illustrated in FIG. 7 have a substantially flat configuration in the sense that they have a first relatively small cross-sectional dimension a, and a relatively large second, orthogonal cross-sectional dimension b.

In preferred embodiments of the invention, the ratio between the dimension a (the major axis) and the dimension b (the minor axis) is between 1.5 and 12. It is more preferred for the ratio to be between 3 and 10, and even more preferred for the ratio to be between 5 and 8. Other preferred ranges for the ratio include 1.5 to 8 and 5 to 12.

Furthermore, because of the flattened cross-sectional profile of the warp yarns 4, 5, it will be seen that the weft yarns 6, 7 actually follow a less tortuous path between the warp yarns, resulting in smaller turning angles than in the conventional fabric illustrated in FIG. 5. The effect of this is that the gaps 11 between adjacent yarns are significantly smaller than in the prior art arrangement of FIG. 5, and thereby require less thickness of coating 10 in order to fill them. The same, of course, applies in the sense that the flattened cross-sectional profile of the weft yarns means that the warp yarns also follow a less tortuous path with smaller turning angles and smaller gaps.

It should therefore be appreciated that the calendered fabric of the present invention, which is preferably calendered prior to application of the coating 10, has an improved structure which allows the application of a significantly thinner coating 10 than is necessary in the case of the prior art structure illustrated in FIG. 5. However, this is not the only benefit of the flattened yarn structure of the present invention, because the increased width of the yarns (i.e. dimension b illustrated in FIG. 7) means that the sett of the fabric can be reduced without increasing the size of the spaces between adjacent yarns. This means that a pre-calendered fabric in accordance with the present invention can be configured to have substantially the same gas-permeability as a more conventional fabric such as that illustrated in FIG. 5, but with significantly reduced sett and hence reduced weight compared to that of the prior art fabric.

It is proposed that in variants of the method described above, moisture and/or further heat may be applied to the fabric during the calendering step. For example, it is proposed that either one or both of the calender rolls may be heated, so as to apply heat the fabric simultaneously with the high pressure. Moisture may also be applied to the fabric at this time, for example in the form of steam.

Figure 8:
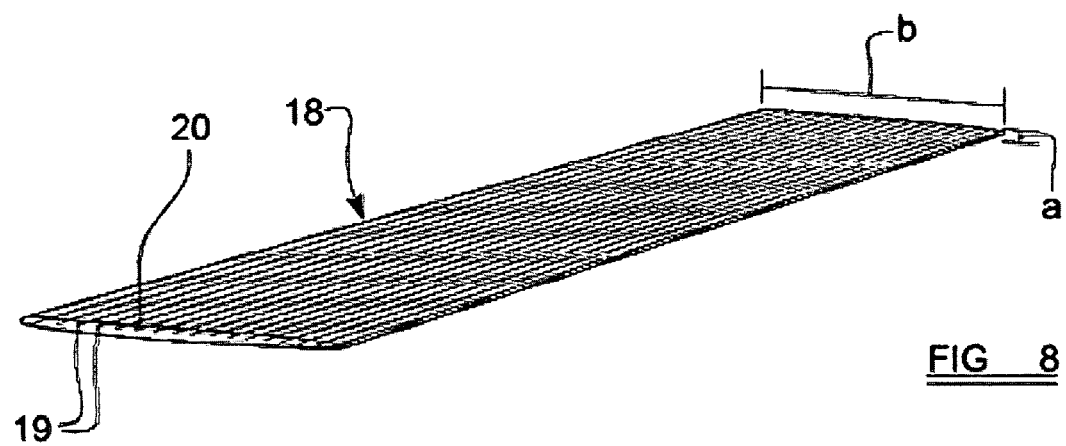
FIG. 8 is a schematic perspective view showing a flat multi-filament yarn which can be woven to form an airbag in accordance with the present invention via an alternative method.

It is also proposed to provide a fabric in accordance with the present invention by weaving the fabric from individual yarns, the yarns themselves having a pre-formed substantially flat configuration. For example, FIG. 8 illustrates an individual flat yarn 18 which comprises a plurality of individual filaments 19, such as polyamide filaments. Alternatively, or in addition, filaments of polyester or polypropylene may be used. The filaments are substantially parallel with one another and are (at least initially) held in a matrix of material, in the form of an additive or coating, which is formed of a thin film. For example, for certain applications the filaments could be held in a thin-film matrix of polypropylene. However it is also possible to provide the filaments in a matrix of a starch-based material which can be removed from the fabric by a washing process after the fabric has been woven, so as to leave behind just the interwoven filaments.

In other embodiments, yarns may be formed from a bundle 20 of filaments, one or more of which is coated with a suitable coating, with the remainder of the filaments 19 initially being substantially uncoated. During activation, it is anticipated that the coating will spread throughout the yarn.

The ratio for the preformed yarns of this type can be as high as 1 to 600 or 1 to 800 (i.e. the ratio of the thickness to the width). In other embodiments the ratio may be 1 to 2,500. A preferred ratio is around 1 to 180.

As will be appreciated, and as illustrated clearly in FIG. 8, the flat yarn 18 has a generally flat configuration such as to have a first relatively small cross-sectional dimension (a) and a second relatively large cross-sectional dimension (b). In fact, the particular flat yarn 18 illustrated in FIG. 8 has a substantially elongate cross-section.

It will be understood that these yarns 18 can be formed using the methods described above, i.e. by providing a yarn comprising a bundle of filaments, which are placed under compression and passed through an activation zone, in order to hold the filaments in the compressed configuration.

It is therefore proposed that in an alternative embodiment of the present invention, an airbag fabric can be woven from a plurality of individual warp and weft yarns, each of which has the substantially flat configuration of the yarn 18 illustrated in FIG. 8. It will therefore be appreciated that the resulting fabric will have a configuration generally similar to that illustrated in FIG. 7, although comprising yarns which may have an even flatter configuration in cross-section.

In the case of a fabric woven from pre-formed flat yarns of the type described above and shown in FIG. 8, the resulting fabric could then be further processed by calendering as proposed above and shown generally in FIG. 6, so as to help reduce the cross-sectional thickness of the fabric even further and to push the flat multifilament yarns into the gaps between yarns.

In embodiments of the invention, flattened yarns are first formed, and the yarns are woven to form a fabric in a subsequent step. In these embodiments, the additive or coating may be configured to be "re-activated" during or after the weaving process, so that the additive or coating acts to bind the yarns in place with respect to each other, as well as to hold the filaments in place within each yarn. This will reduce the tendency of adjacent yarns to slide past one another, particularly when the fabric is placed under tension. The seam strength will also be improved, as will control over the permeability of the fabric.

Following formation of the flattened yarns, a further additive or coating may be applied to the yarns prior to weaving.

As described above, following weaving of the fabric from the pre-flattened yarns, the fabric may pass through a further activation zone that activates or re-activates the additive or coating. As before, the activation zone may provide compression, heat, or other conditions required for activation of the additive or coating.

In fabrics woven from flattened yarns the yarns may have a thickness of two filaments.

When used in this specification and claims, the terms "comprise", "comprises" and "comprising" and variations thereof mean that the specified features, steps or integers are included. The terms are not to be interpreted to exclude the presence of other features, steps or components.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilized for realizing the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. It will be appreciated that the invention is susceptible to modification, variation, and change without departing from the proper scope and fair meaning of the accompanying claims.

The invention claimed is:

1. A method of forming a fabric for an air-bag, the method comprising the steps of:
   providing a plurality of yarns, each yarn being formed from a plurality of individual fibers;
   applying an activatable additive or an activatable coating to each yarn, the additive or the coating initially not being activated and wherein, prior to activation, the additive or the coating presents little or no impedance to the relative movement of the fibers within the yarn and, following activation, the additive or the coating binds the fibers within the yarn to one another to prevent or hinder relative movement of the fibers in the yarn with respect to one another;
   weaving the plurality of yarns into a fabric; and
   passing the yarns through an activation zone, the activation zone including a compressing component which applies a compressive force to the yarns, the additive or the coating being activated as the yarns pass through the activation zone so that, following activation of the additive or of the coating, the yarns each have a substantially flat configuration so as to have a first relatively small cross-sectional dimension (a), and a second relatively large cross-sectional dimension (b).

2. The method according to claim 1, wherein the coating or the additive is activated by the application of pressure to the yarns.

3. The method according to claim 1, wherein the coating or the additive is activated by heat.

4. The method according to claim 1, further comprising applying a further additional coating to at least one surface of the fabric.

5. The method according to claim 4, wherein the step of applying the further coating comprises applying the further coating in a substantially liquid phase.

6. The method of claim 4, wherein the step of applying the further coating comprises forming a thin film of the further coating and laminating the film to the fabric.

7. The method according to claim 1 wherein, following the passing of the yarns through the activation zone, the ratio of the first and second dimensions is at least 1.5.

8. The method according to claim 1, wherein a plurality of the yarns are woven into the fabric before being passed through the activation zone.

9. The method according to claim 1, wherein a plurality of the yarns are woven into the fabric after passing through the activation zone.

10. The method according to claim 9 wherein, during or after weaving the yarns into the fabric, the fabric is passed through a second activation zone.

11. The method according to claim 10 wherein, after the fabric has passed through the second activation zone, the additive or coating is activated and binds the yarns within the fabric to one another to prevent or hinder relative movement of the yarns with respect to one another.

12. The method according to claim 10 further comprising the step of applying a further additional additive or coating to the yarns prior to the weaving of the yarns to form the fabric, and wherein the further additive or coating is activated and binds the yarns within the fabric to one another to prevent or hinder relative movement of the yarns with respect to one another.

13. The method of claim 1 further comprising the step of providing an air-bag formed from the fabric.

14. The method of claim 1, wherein the additive or coating is activated through contact with another substance.

15. The method of claim 1, wherein the yarns are arranged to define a plurality of gaps therebetween, and the additive or coating fills the gaps after being activated.

16. The method of claim 1, the fabric is woven in both a weft and warp direction.

17. An inflatable airbag for a motor vehicle safety device, the airbag comprising a fabric, wherein the fabric comprises yarns that each include a plurality of fibers and are formed into a substantially flat configuration so as to have a first cross-sectional dimension and a second cross-sectional dimension that is greater than the first cross-sectional dimension, at least some fibers in each yarn being bonded to other fibers in the yarn by an activated coating or additive, wherein, prior to activation, the additive or coating presents little or no impedance to relative movement of the fibers within the yarn and, following activation, the additive or coating binds the fibers within the yarn to one another to prevent or hinder relative movement of the fibers in the yarn with respect to one another;
   wherein the yarns of the fabric are woven.

18. The airbag according to claim 17, wherein the ratio of the first and second dimensions is at least 1.5.

19. The airbag according to claim 17, wherein the airbag has a one-piece-woven construction comprising two layers of the fabric, the two layers being combined in selected areas to form an integral seam in which yarns forming one of the layers are interwoven with yarns forming the other layer.

20. The airbag according to claim 17, wherein the yarns comprise filaments of a polyamide, a polyester, or a polypropylene.

21. A method of forming a fabric for an airbag, the method comprising the steps of:
   providing a plurality of yarns, the yarns each having a substantially flat configuration so as to have a first cross-sectional dimension and a second cross-sectional dimension that is greater than the first cross-sectional dimension, and having an activatable additive or coating applied to at least some of the yarns, the additive or coating, prior to weaving, not being activated and wherein, prior to activation, the additive or coating presents little or no impedance to relative movement of yarns with respect to one another and, following activation, the additive or coating binds the yarns to one another to prevent or hinder relative movement of the yarns with respect to one another;
   weaving the yarns to form a fabric; and
   passing the fabric through an activation zone, the additive or coating being activated as the fabric pass through the activation zone.

22. The method of claim 21, wherein the activation of the additive or coating comprises re-activation of the additive or coating.

* * * * *